US012665994B2

(12) United States Patent
Okuoka et al.

(10) Patent No.: US 12,665,994 B2
(45) Date of Patent: Jun. 23, 2026

(54) IMAGE PROCESSING APPARATUS, IMAGE PICKUP APPARATUS, LENS APPARATUS, IMAGE PROCESSING METHOD, AND STORAGE MEDIUM FOR CORRECTING COLOR SHADING IN IMAGE DATA

(71) Applicant: CANON KABUSHIKI KAISHA, Tokyo (JP)

(72) Inventors: Shinya Okuoka, Saitama (JP); Satoshi Maetaki, Tochigi (JP); Masato Katayose, Tochigi (JP); Yuki Shinzato, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/772,506

(22) Filed: Jul. 15, 2024

(65) Prior Publication Data
US 2025/0055964 A1 Feb. 13, 2025

(30) Foreign Application Priority Data

Aug. 10, 2023 (JP) ................................. 2023-130816

(51) Int. Cl.
H04N 5/335 (2011.01)
H04N 9/64 (2023.01)
(Continued)

(52) U.S. Cl.
CPC ............. H04N 9/646 (2013.01); H04N 23/12 (2023.01); H04N 23/55 (2023.01)

(58) Field of Classification Search
CPC ................................................... H04N 1/6077
See application file for complete search history.

(56) References Cited

U.S. PATENT DOCUMENTS

2009/0002526 A1* 1/2009 Koishi ................. H04N 23/663
                                                    348/241
2013/0002912 A1 1/2013 Park
2019/0377166 A1* 12/2019 Komatsu ............. G02B 15/173

FOREIGN PATENT DOCUMENTS

JP        2000324505 A  * 11/2000
JP        2012-203142 A   10/2012
JP        2012-244239 A   12/2012

OTHER PUBLICATIONS

Extended European Search Report issued by the European Patent Office on Oct. 10, 2024 in corresponding EP Patent Application No. 24189625.7.

(Continued)

*Primary Examiner* — Gary C Vieaux
(74) *Attorney, Agent, or Firm* — Carter, DeLuca & Farrell LLP

(57) ABSTRACT

An image processing apparatus acquires image data, and corrects color shading in the image data using color shading information according to a characteristic of an optical system. The image data corresponds to an optical image that has passed through an optical filter that separates light that has passed through the optical system into a first color component, a second color component, and a third color component. The color shading information includes information regarding a value of the first color component, a value of the second color component, and a value of the third color component, and differs according to a focal length of the optical system.

16 Claims, 4 Drawing Sheets

(51) Int. Cl.
  H04N 23/12           (2023.01)
  H04N 23/55           (2023.01)

(56)                      References Cited

OTHER PUBLICATIONS

Office Action issued by the European Patent Office on Mar. 10, 2026
in corresponding EP Patent Application No. 24189625.7.

* cited by examiner

IMAGE PROCESSING APPARATUS, IMAGE PICKUP APPARATUS, LENS APPARATUS, IMAGE PROCESSING METHOD, AND STORAGE MEDIUM FOR CORRECTING COLOR SHADING IN IMAGE DATA

BACKGROUND

Technical Field

One of the aspects of the embodiments relates to an image processing apparatus, an image pickup apparatus, a lens apparatus, an image processing method, and a storage medium.

Description of Related Art

Images captured through an optical system may include significant color shading due to a transmittance difference caused by a thickness difference between the central portion and peripheral portion of a lens in the optical system, and a thickness difference in an antireflection film between the central portion and peripheral portion of the lens caused by manufacturing errors in the antireflection film coated on the lens surface. Here, color shading (color unevenness) refers to a phenomenon in which the color tone of an image captured by an image pickup apparatus of a uniform luminance surface differs between the central portion and peripheral portion of the image.

Japanese Patent Laid-Open No. 2012-244239 discloses a method of storing a correction term for correcting the luminance shading and color shading of a captured image according to an imaging condition, and of correcting the luminance shading and color shading using that correction term after a captured image is acquired.

The method disclosed in Japanese Patent Laid-Open No. 2012-244239 can correct both color shading and luminance shading, so the luminance around the captured image is affected.

SUMMARY

An image processing apparatus according to one aspect of the disclosure includes a memory storing instructions, and a processor configured to execute the instructions to acquire image data, and correct color shading in the image data using color shading information according to a characteristic of an optical system. The image data corresponds to an optical image that has passed through an optical filter that separates light that has passed through the optical system into a first color component, a second color component, and a third color component. The color shading information includes information regarding a value of the first color component, a value of the second color component, and a value of the third color component, and differs according to a focal length of the optical system. An image pickup apparatus and a lens apparatus each having the above image processing apparatus also constitutes another aspect of the disclosure. An image processing method corresponding to the above image processing apparatus also constitutes another aspect of the disclosure. A storage medium storing a program that causes a computer to execute the above image processing method also constitutes another aspect of the disclosure.

Further features of various embodiments of the disclosure will become apparent from the following description of embodiments with reference to the attached drawings.

DESCRIPTION OF THE EMBODIMENTS

Figure 1:
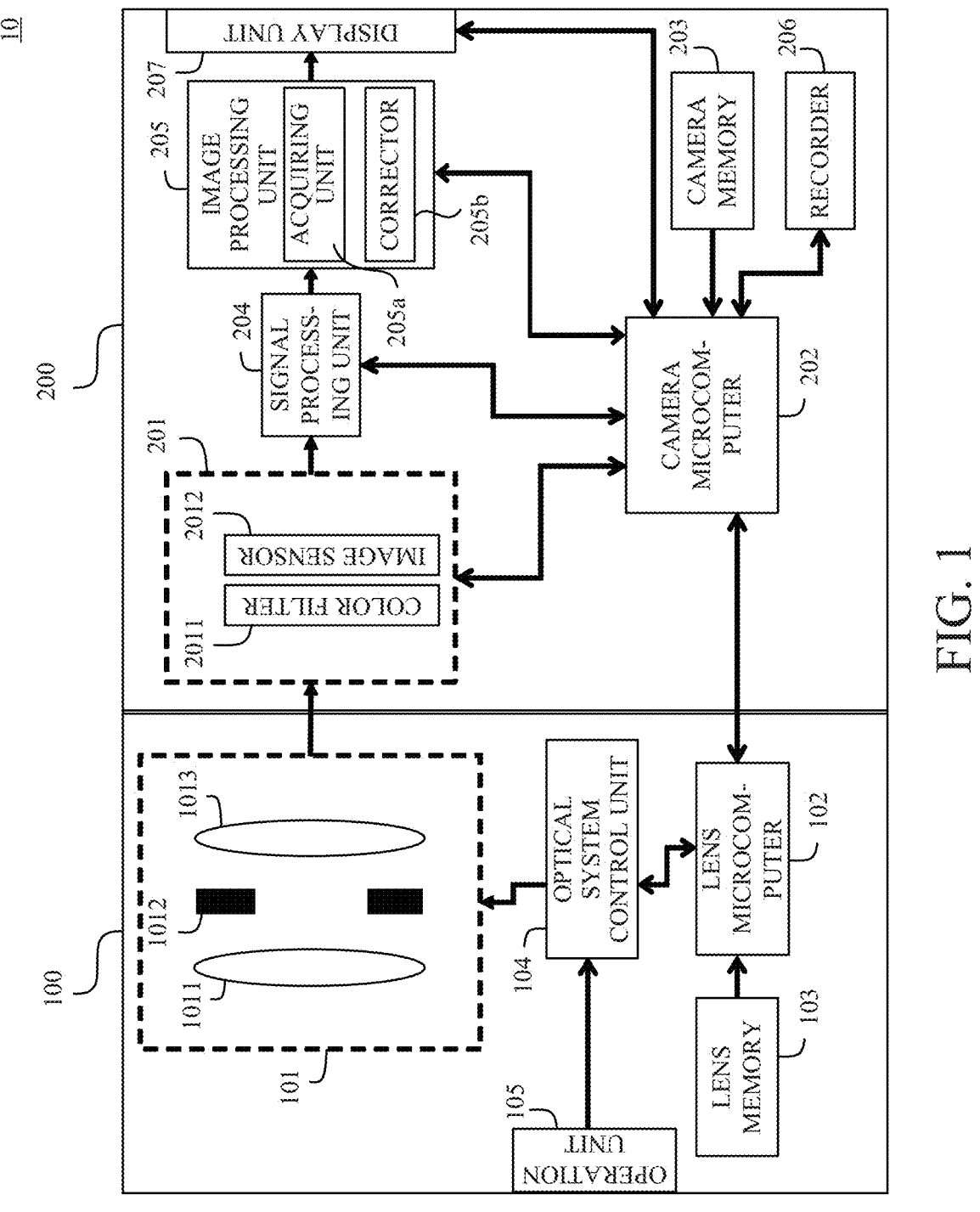
FIG. 1 is a configuration diagram of an imaging system according to each embodiment.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure. Corresponding elements in respective figures will be designated by the same reference numerals, and a duplicate description thereof will be omitted.

First Embodiment

Configuration of Imaging System

Referring now to FIG. 1, a description will be given of an imaging system 10 according to a first embodiment of the present disclosure. FIG. 1 is a configuration diagram of the imaging system 10. The imaging system 10 includes a camera (image pickup apparatus) 200 and an interchangeable lens (lens apparatus) 100 that is attachable to and detachable from the camera 200. However, the present embodiment is not limited to this example, and can be applied to an imaging system in which the image pickup apparatus and the lens apparatus are integrated.

The interchangeable lens 100 includes an optical system (imaging optical system) 101, a lens microcomputer 102, a lens memory (storage unit) 103, an optical system control unit 104, and an operation unit 105. The camera 200 includes an imaging unit 201, a camera microcomputer 202, a camera memory (storage unit) 203, a signal processing unit 204, an image processing unit (image processing apparatus) 205, a recorder 206, and a display unit 207. In addition, the lens microcomputer 102 and the camera microcomputer 202 may be configured as control units separate from the interchangeable lens 100 and the camera 200, respectively. FIG. 1 omits components that are not related to this embodiment.

The optical system 101 has a magnification varying optical system 1011, an aperture stop (diaphragm) 1012, and a focus optical system 1013. The optical system 101 forms an object image on an image sensor 2012 of the imaging unit 201 using light from an object at an in-focus position. The magnification varying optical system 1011 changes a focal length. The aperture stop 1012 adjusts a light amount taken in from the object. The focus optical system 1013 is an optical system for focusing on the object.

The lens microcomputer 102 is a communication unit for communicating with a camera microcomputer 202 that controls the camera 200. The lens microcomputer 102 reads out necessary information from the lens memory 103 according to a command received from the camera microcomputer 202, and transmits data requested by the camera microcomputer 202 to the camera microcomputer 202.

The optical system control unit 104 drives the aperture blades of the aperture stop 1012 and drives the focus optical system 1013 to perform focusing according to a command from the lens microcomputer 102.

The lens memory 103 stores color shading information on the optical system 101. As described later, the color shading information in this embodiment is information on a ratio value (B/G) of a first color component (B) to a second color component (G) and a ratio value (R/G) of a third color component (R) to the second color component (G). The color shading information is stored in association with the state (imaging condition) of the optical system 101, such as a focal length of the optical system 101, an in-focus object distance, and an aperture diameter (aperture value, F-number), for each position in the image data, such as the image height. In other words, the color shading information differs according to the state of the optical system 101, such as a focal length of the optical system 101, an in-focus object distance, and an aperture diameter.

Using such color shading information can satisfactorily correct color shading in a captured image according to the characteristic of the optical system 101. Here, color shading refers to a color difference in an image in a case where a uniform luminance surface is imaged, particularly a difference in color tone between the central portion and the peripheral portion of the image. The characteristic of the optical system 101 is, for example, the transmittance of the lens in the optical system 101, or a characteristic relating to an antireflection film provided on the lens. Instead of the lens memory 103, the camera memory 203 may store color shading information on the optical system 101. Alternatively, both the lens memory 103 and the camera memory 203 may store color shading information on the optical system 101.

The operation unit 105 is provided so that the user can manually operate the optical system 101. For example, the user can change the focal length by manually operating the position of the magnification varying optical system 1011 of the optical system 101, and can change the in-focus position by manually adjusting the position of the focus optical system.

The imaging unit 201 includes a color filter (optical filter) 2011 and the image sensor 2012. The color filter 2011 has a filter that transmits blue light to separate an object image into a first color component (B), a filter that transmits green light to separate an object image into a second color component (G), and a filter that transmits red light to separate an object image into a third color component (R). For example, a Bayer array is used as an arrangement pattern for each color. The object image separated into three color components by the color filter 2011 is formed on the image sensor 2012. The image sensor 2012 is a photoelectric conversion element such as a CCD (Charge Coupled Device) image sensor or a CMOS (Complementary Metal Oxide Semiconductor) image sensor. The image sensor 2012 photoelectrically converts an object image (optical image) formed by the optical system 101 and outputs an analog signal.

Figures 2, 3:
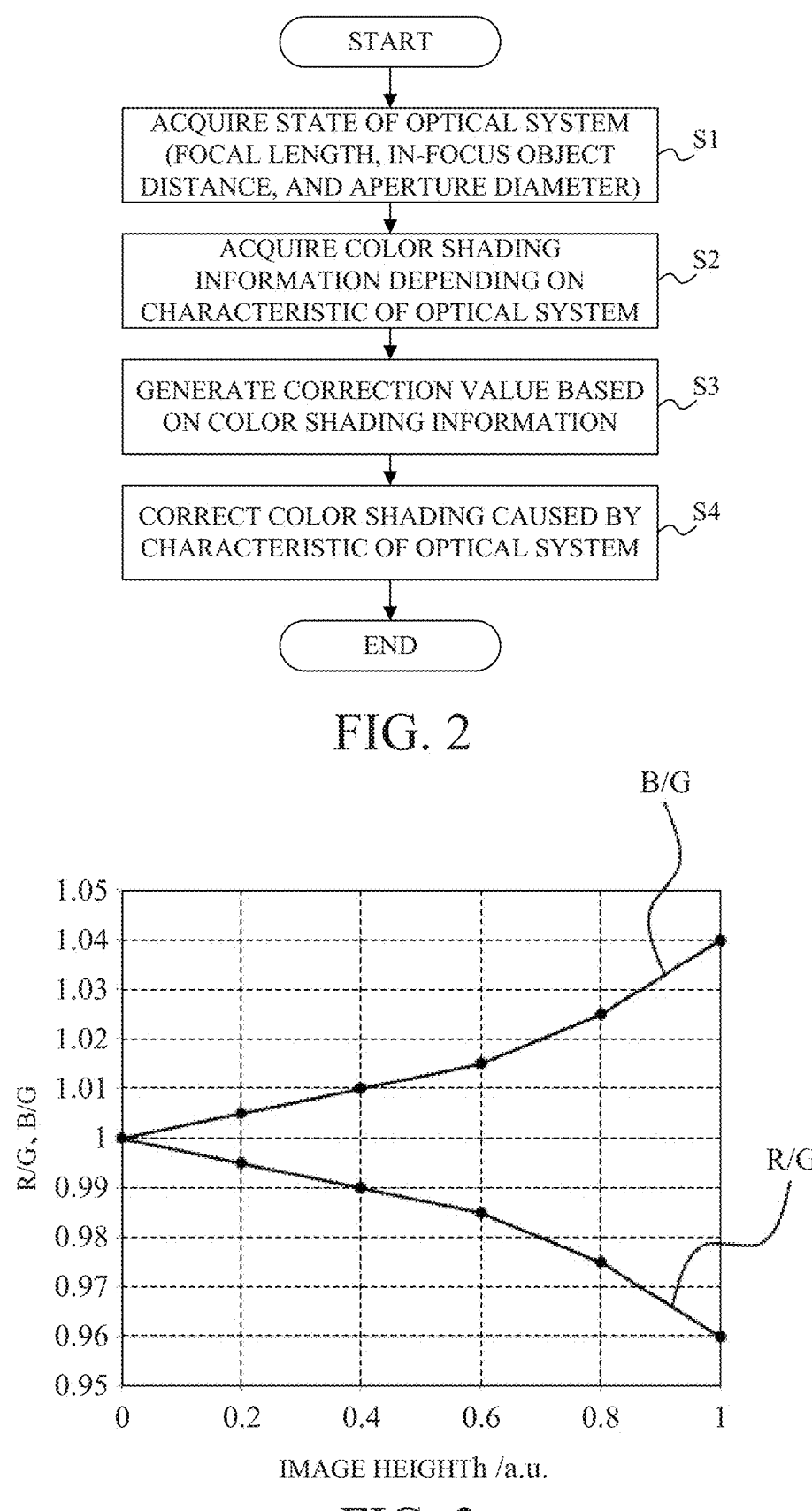
FIG. 2 is a flowchart illustrating a color shading correcting method according to each embodiment.
FIG. 3 illustrates color shading information in each embodiment.

The camera microcomputer 202 controls each part of the camera 200 and communicates with the lens microcomputer 102 to control the interchangeable lens 100. The camera microcomputer 202 corrects color shading in an image. Referring now to FIG. 2, a description will be given of a method of correcting color shading in an image using the camera microcomputer 202. FIG. 2 is a flowchart illustrating the color shading correction method.

First, in step S1, the camera microcomputer 202 acquires the state of the optical system 101 (information such as a focal length, a focused or in-focus object distance, and an aperture diameter) from the lens microcomputer 102 and the optical system control unit 104. Next, in step S2, the camera microcomputer 202 acquires from the lens memory 103 color shading information (information according to the characteristic of the optical system 101) due to the characteristic of the optical system 101 in the state of the optical system 101 acquired in step S1. Next, in step S3, the camera microcomputer 202 generates a correction value based on the color shading information acquired in step S2. Next, in step S4, the camera microcomputer 202 corrects color shading caused by the characteristic of the optical system 101.

The camera memory 203 stores various information necessary for the operation of the camera microcomputer 202 and the lens microcomputer 102. The signal processing unit 204 converts the analog signal output from the imaging unit 201 into a digital signal and outputs it to the image processing unit 205.

The image processing unit 205 performs color shading correcting processing for the digital signal in accordance with the control of the camera microcomputer 202, and generates image information (image data). The image data corresponds to an optical image that has passed through a color filter 2011 that separates light that has passed through the optical system 101 into a first color component (B), a second color component (G), and a third color component (R). The image information generated by the image processing unit 205 is output to the recorder 206, or is displayed on the display unit 207. In this embodiment, the image processing unit 205 includes an acquiring unit 205a and a corrector 205b. The acquiring unit 205a acquires image information regarding an image captured by the imaging unit 201. The corrector 205b corrects the color shading in the image data acquired by the acquiring unit 205a using color shading information according to the characteristic of the optical system 101.

Color Shading Information and Color Shading Correction According to the Characteristic of Optical System 101

FIG. 3 illustrates color shading information. In FIG. 3, a horizontal axis represents an image height h, and a vertical axis represents color shading information. The color shading information is acquired (calculated) for each image height (distance from the center of the captured image) obtained by dividing by an arbitrary number the ratio B/G of the first color component (B) to the second color component (G) and the ratio R/G of the third color component (R) to the second color component (G).

In order to correct the color component relative to the center of the captured image (the central position in the image data), this embodiment previously stores a value of the color shading information on each image height divided by the color shading information at the center of the captured image, in the lens memory 103. In other words, the color shading information is a value based on the central position in the image data (the value divided by the ratio value of the central position). Then, color shading correction is performed using the color shading information. Here, color shading correction includes multiplying the first color component (B) by the inverse of B/G for each image height, and multiplying the third color component (R) by the inverse of R/G for each image height. The correction ratio may be adjusted by multiplying the inverse of B/G or the inverse of R/G by a coefficient. For B/G or R/G between image heights divided by the arbitrary number, the B/G or R/G of the closest image height may be used, or B/G or R/G obtained by an arbitrary interpolation method may be used.

Derivation of Color Shading Information Based on Characteristic of Optical System 101

In this embodiment, the color shading information based on the characteristic of the optical system 101 can be calculated by numerical simulation. In the numerical simulation, the color shading information is calculated using a value (numerical simulation value) of a spectral transmittance Tl of the optical system 101 calculated for each image height, a spectral distribution S of the light source assumed during imaging, and a spectral transmittance of the color filter 2011.

Figure 4:
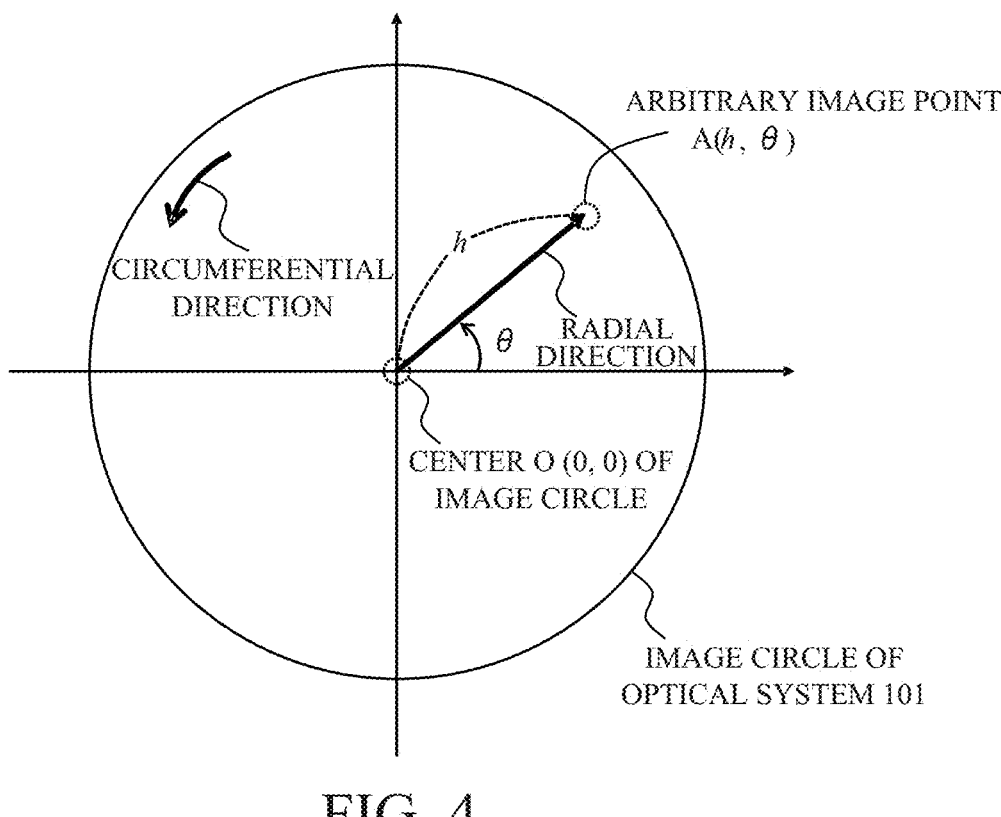
FIG. 4 explains an image circle in each embodiment.

A description will now be given of a method of calculating the spectral transmittance of the optical system 101. FIG. 4 explains an image circle formed on the image sensor 2012 by the optical system 101. The optical system 101 is a rotationally symmetric optical system, and in a polar coordinate system with the center O of the image circle as an origin, the spectral transmittance may be calculated for each image height in any radial direction (for example, θ=0).

Figure 5:
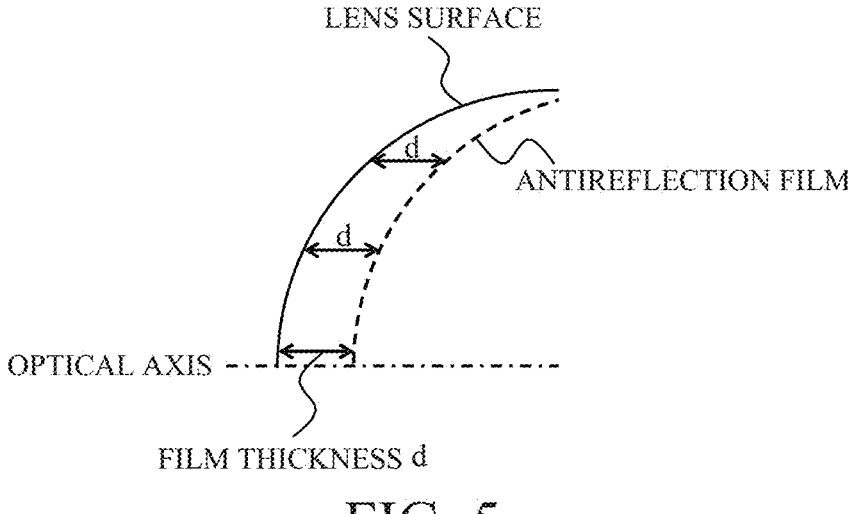
FIG. 5 explains a model of an antireflection film of a lens according to each embodiment.

FIG. 5 explains a model that is used in a numerical simulation of an antireflection film on a lens surface included in the optical system 101. This model assumes that the deposition source of the antireflection film is located sufficiently distant from the center of curvature of the lens, and the antireflection film is attached to the lens in a direction parallel to the optical axis. Therefore, a film thickness d in the direction parallel to the optical axis is the same (constant) at the center and periphery of the lens. This embodiment calculates the spectral transmittance of the optical system 101 for each image height using the model of the antireflection film illustrated in FIG. 5.

Next, a general imaging environment is assumed as a light source during imaging, and a spectral distribution S of daylight white with a color temperature of about 5000 K is used, for example.

Finally, the spectral transmittance of each color component is used as the spectral transmittance of the color filter 2011. The color filter 2011 includes a filter (first filter) that transmits blue light for separating light into a first color component, a filter (second filter) that transmits green light for separating light into a second color component, and a filter (third filter) that transmits red light for separating light into a third color component. That is, the spectral transmittance Tb of the first filter, the spectral transmittance Tg of the second filter, and the spectral transmittance Tr of the third filter are used. The peak wavelength of the spectral transmittance Tb is in the range of 400 nm to 500 nm, the peak wavelength of the spectral transmittance Tg is in the range of 500 nm to 570 nm, and the peak wavelength of the spectral transmittance Tr is in the range of 570 nm to 700 nm.

The above values and the following equations (1) and (2) can be used to calculate color shading information for each image height.

$$B(h)/G(h) = \int (Tl(h) \cdot S \cdot Tb)d\lambda / \int (Tl(h) \cdot S \cdot Tg)d\lambda \tag{1}$$

$$R(h)/G(h) = \int (Tl(h) \cdot S \cdot Tr)d\lambda / \int (Tl(h) \cdot S \cdot Tg)d\lambda \tag{2}$$

In equations (1) and (2), $\lambda$ is a wavelength, the integral interval is from 400 nm to 700 nm, and h is an image height.

In this embodiment, in order to correct the color component relative to the center (h=0) of the captured image, this embodiment uses the value (3) obtained by dividing equation (1) by B(0)/G(0) and the value (4) obtained by dividing equation (2) by R(0)/G(0). The values obtained by equations (3) and (4) are stored as color shading information in the lens memory 103.

$$\left[ B(h)/G(h) \right] / \left[ B(0)/G(0) \right] \tag{3}$$

$$\left[ R(h)/G(h) \right] / \left[ R(0)/G(0) \right] \tag{4}$$

The color shading information obtained by equations (3) and (4) changes according to the state of the optical system 101, such as a focal length, in-focus object distance, and aperture diameter. In this embodiment, the lens memory 103 divides the state of the optical system 101 into an arbitrary number and stores multiple pieces of color shading information that differ according to the state of the optical system 101. Thereby, color shading can be satisfactorily corrected even in the magnification variation of the optical system 101, a change in in-focus object distance, or a change in aperture diameter. In a case where the state of the optical system 101 is divided into an arbitrary number of states, the color shading information between the states can use values obtained by an arbitrary interpolation method, or the color shading information on the closest state can be used. The number of divisions of the state of the optical system 101 may be set to one without dividing the state of the optical system 101 in order to save the storage capacity of the lens memory 103.

Color shading correction can be performed using the color shading information thus calculated. More specifically, the first color component is multiplied by the inverse of the value obtained by equation (3), and the third color component is multiplied by the inverse of the value obtained by equation (4).

In this embodiment, the optical system 101 is a rotationally symmetric optical system, but this embodiment can also be applied to a rotationally asymmetric optical system that is not rotationally symmetric. In a rotationally asymmetric optical system where a polar coordinate system is defined with the center of the captured image as the origin, color shading information in the circumferential direction may be added to color shading information in the radial direction.

In this embodiment, the light source during imaging has a daylight spectral distribution of about 5000K, but is not limited to this example. For example, the spectral distribution of any light source may be changed according to the environment during imaging is performed.

In this embodiment, the interchangeable lens 100 is interchangeable with respect to the camera 200, so that proper color shading information can be used for each interchangeable lens. Thereby, color shading can be satisfactorily corrected even when a different interchangeable lens is attached to the camera 200.

Second Embodiment

A description will now be given of a second embodiment of the present disclosure. This embodiment calculates color shading information depending on the characteristic of the optical system 101 using a spectral transmittance measurement value of the optical system 101, and previously stores it in the lens memory 103. In other words, this embodiment calculates color shading information using the spectral transmittance measurement value of the optical system 101, the spectral transmittance of the color filter 2011, and the spectral distribution of the light source assumed during imaging. The configuration of the imaging system, the color shading information, and the color shading correcting processing in this embodiment are the same as those of the first embodiment, and thus a detailed description thereof will be omitted.

In the first embodiment, the optical system 101 is a rotationally symmetric optical system, and has the same optical characteristic in the circumferential direction at any image height. Thus, in calculating the spectral transmittance by numerical simulation, the spectral transmittance may be calculated for each image height in any radial direction from the optical axis. However, an actual optical system is rotationally asymmetric due to decentering caused by manufacturing errors. Therefore, the optical characteristic in the circumferential direction differ even at the same image height. In addition, while the model of the antireflection film (antireflection coating) illustrated in FIG. 5 is a rotationally symmetric system, the antireflection film of an actual lens is rotationally asymmetric due to manufacturing errors. This embodiment corrects color shading using color shading information based on manufacturing errors.

In a polar coordinate system with the center O of the image circle illustrated in FIG. 3 as the origin, this embodiment measures the spectral transmittance in the radial direction and the circumferential direction. The spectral transmittance may be measured in eight radial directions (image heights) every $\theta=45$ degrees in the circumferential direction, and an average of the results of these eight measurements may be set as the spectral transmittance of the optical system 101. In this case, the color shading information is a value obtained by averaging information in a plurality of radial directions from the central position in the image data (a common value is obtained at the same image height). The color shading information is calculated from this spectral transmittance in the same manner as in the first embodiment, and stored in the lens memory 103.

The thus calculated color shading information enables color shading to be satisfactorily corrected even if the optical system 101 is decentered due to manufacturing errors. In measuring the spectral transmittance in the radial direction and the circumferential direction, this embodiment sets the number of divisions in the circumferential direction to eight, but is not limited to this example, and may use any number of divisions. This embodiment calculates the color shading information using a value obtained by averaging the spectral transmittances in a plurality of radial directions, but is not limited to this example, and may use color shading information that differs in the radial direction without averaging the spectral transmittances.

Third Embodiment

A description will now be given of a third embodiment of the present disclosure. This embodiment calculates color shading information depending on the characteristic of the optical system 101 previously obtained from image information (image data) obtained using the camera 200, and stores it in the lens memory 103. That is, in this embodiment, the color shading information is calculated using image data obtained by imaging. The configuration of the imaging system, the color shading information, and the color shading correcting processing according to this embodiment are the same as those of the first embodiment, and thus a detailed description thereof will be omitted.

This embodiment is to measure the spectral transmittance at many positions within the image circle, and takes a long measurement time. This embodiment uses image information obtained by the camera 200 to simply obtain the color shading information on the optical system 101.

A description will now be given of a method of calculating the color shading information on the optical system 101 using the camera 200. First, the camera 200 images a uniform luminance surface having a daylight light source with a color temperature of about 5000 K. At this time, image information is acquired without performing color shading correcting processing performed by the image processing unit 205. No color shading correcting processing provides image information to which the color shading information on the optical system 101 is added.

Color shading occurs in the camera 200 in a case where the position of the color filter 2011 is shifted from a pixel (light receiving element) in the image sensor 2012 due to manufacturing errors, or light rays from the optical system 101 obliquely enter an adjacent pixel and the adjacent pixel has a different color component. In a case where the camera 200 has an infrared cut filter, the reflection characteristic changes due to obliquely incident rays, and color shading occurs.

Thus, the image information contains not only color shading information generated by the characteristic of the optical system 101, but also color shading information generated by the characteristic of the camera 200. Hence, in order to obtain the color shading information on the optical system 101 from the image information, the color shading information generated by the characteristic of the camera 200 is to be removed.

In order to remove the color shading due to the characteristic of the camera 200 from the image information, the color shading information generated by the characteristic of the camera 200 when a light beam equivalent to that of the optical system 101 is incident is previously examined. Removing the color shading information generated by the camera 200 that has been previously examined from the image information can provide the color shading information on the optical system 101 using the camera 200.

Figure 6:
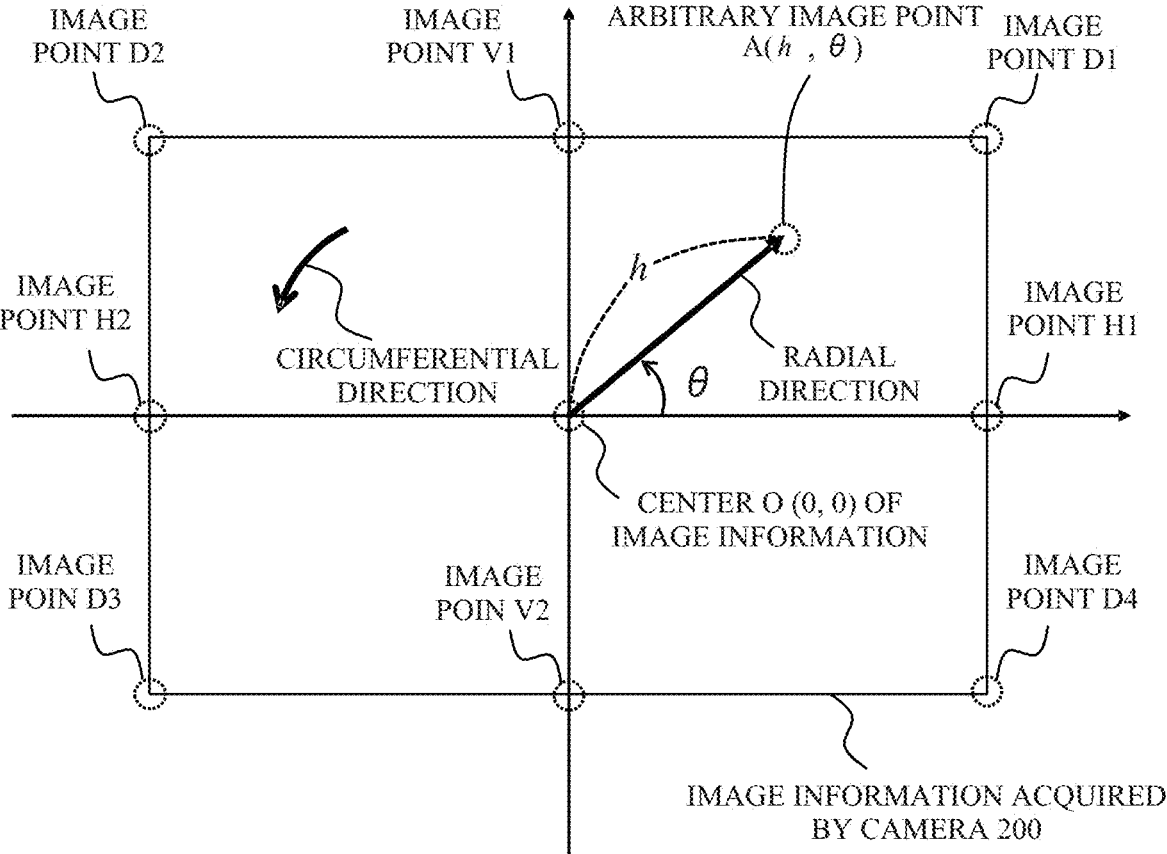
FIG. 6 explains image information in a third embodiment.

Using the color shading information on the optical system 101 in the entire image information illustrated in FIG. 6 obtained by the above method enables the color shading in the entire image information to be satisfactorily corrected. This embodiment may reduce an information amount stored in the lens memory 103. Thus, the color shading information in eight directions from the center O of the image information illustrated in FIG. 6, including horizontal image points H1 and H2, vertical image points V1 and V2, and diagonal image points D1, D2, D3, and D4, may be averaged and stored, and the color shading correction value in the circumferential direction may be equalized. In this embodiment, the camera 200 has imaged a uniform daylight white light source with a color temperature of about 5000K, but this is merely an assumption of a light source in a general imaging environment, and this embodiment is not limited to this example. For example, the light source may be changed to any light source according to an imaging environment.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each embodiment corrects color shading according to the characteristic of the optical system using color shading information, which is the ratio value (B/G) of the first color component to the second color component and the ratio value (R/G) of the third color component to the second color component. Therefore, each embodiment can provide an image processing apparatus, an image pickup apparatus, a lens apparatus, and an image processing method, each of which can suppress luminance changes around a captured image and properly correct the color tone of the captured image.

This application claims priority to Japanese Patent Application No. 2023-130816, which was filed on Aug. 10, 2023, and which is hereby incorporated by reference herein in its entirety.

What is claimed is:

1. An image processing apparatus comprising:

a memory storing instructions; and a processor configured to execute the instructions to:

acquire image data, and correct color shading in the image data using color shading information according to a characteristic of an optical system, wherein the image data corresponds to an optical image that has passed through an optical filter that separates light that has passed through the optical system into a first color component, a second color component, and a third color component, wherein the color shading information includes information regarding a value of the first color component, a value of the second color component, and a value of the third color component, and differs according to a focal length of the optical system, and wherein the color shading information is calculated using values of a spectral transmittance of each image height in the optical system, wherein the color shading information is calculated using a measurement value of a spectral transmittance of the optical system, a spectral transmittance of the optical filter, and a spectral distribution of a light source.

2. The image processing apparatus according to claim 1, wherein the memory further stores the color shading information.

3. The image processing apparatus according to claim 1, wherein the color shading information relates to a ratio value of the first color component to the second color component, and a ratio value of the third color component to the second color component.

4. The image processing apparatus according to claim 1, wherein the color shading information differs according to an in-focus object distance of the optical system.

5. The image processing apparatus according to claim 1, wherein the color shading information differs according to an aperture diameter of the optical system.

6. The image processing apparatus according to claim 1, wherein the color shading information is a value based on a central position in the image data.

7. The image processing apparatus according to claim 1, wherein the optical filter includes a first filter that separates the light into the first color component, a second filter that separates the light into the second color component, and a third filter that separates the light into the third color component, wherein a spectral transmittance of the first filter has a peak wavelength in a range of 400 nm to 500 nm, wherein a spectral transmittance of the second filter has a peak wavelength in a range of 500 nm to 570 nm, and wherein a spectral transmittance of the third filter has a peak wavelength in a range of 570 nm to 700 nm.

8. The image processing apparatus according to claim 1, wherein the color shading information has a value obtained by averaging information in a plurality of radial directions from a central position in the image data.

9. The image processing apparatus according to claim 1, wherein the color shading information is calculated using a numerical simulation value of a spectral transmittance of the optical system, a spectral transmittance of the optical filter, and a spectral distribution of a light source.

10. The image processing apparatus according to claim 1, wherein the color shading information is calculated using the image data.

11. An image pickup apparatus comprising:

an image sensor; and the image processing apparatus according to claim 1.

12. A lens apparatus comprising:

an optical system; and the image processing apparatus according to claim 1.

13. A lens apparatus attachable to and detachable from an image pickup apparatus, the lens apparatus comprising:

an optical system;

a memory configured to store color shading information according to a characteristic of the optical system for use with a correction of color shading in image data acquired by the image pickup apparatus; and a communicator configured to communicate with the image pickup apparatus, wherein the communicator transmits the color shading information stored in the memory to the image pickup apparatus according to a request from the image pickup apparatus, wherein the image data corresponds to an optical image that has passed through an optical filter that separates light that has passed through the optical system into a first color component, a second color component, and a third color component, wherein the color shading information includes information regarding a value of the first color component, a value of the second color component, and a value of the third color component, and differs according to a focal length of the optical system, and wherein the color shading information is calculated using values of a spectral transmittance of each image height in the optical system, wherein the color shading information is calculated using a measurement value of a spectral transmittance of the optical system, a spectral transmittance of the optical filter, and a spectral distribution of a light source.

14. An image processing method comprising the steps of:

acquiring image data, and correcting color shading in the image data using color shading information according to a characteristic of an optical system, wherein the image data corresponds to an optical image that has passed through an optical filter that separates light that has passed through the optical system into a first color component, a second color component, and a third color component, wherein the color shading information includes information regarding a value of the first color component, a value of the second color component, and a value of the third color component, and differs according to a focal length of the optical system, and wherein the color shading information is calculated using values of a spectral transmittance of each image height in the optical system, wherein the color shading information is calculated using a measurement value of a spectral transmittance of the optical system, a spectral transmittance of the optical filter, and a spectral distribution of a light source.

15. A non-transitory computer-readable storage medium storing a program that causes a computer to execute the image processing method of claim 14.

16. An image processing apparatus comprising:

a memory storing instructions; and processor configured to execute the instructions to:

acquire image data, and correct color shading in the image data using color shading information according to a characteristic of an optical system, wherein the image data corresponds to an optical image that has passed through an optical filter that separates light that has passed through the optical system into a first color component, a second color component, and a third color component, wherein the color shading information includes information regarding a value of the first color component, a value of the second color component, and a value of the third color component, and differs according to a focal length of the optical system, and wherein the color shading information is calculated using values of a spectral transmittance of each image height in the optical system, wherein the color shading information is calculated using a numerical simulation value of a spectral transmittance of the optical system, a spectral transmittance of the optical filter, and a spectral distribution of a light source.

\*    \*    \*    \*    \*